Aug. 5, 1969 P. L. POWELL 3,459,051
SPEEDOMETER

Filed May 5, 1967 2 Sheets-Sheet 1

INVENTOR
Patrick L. Powell.

By Norton Lesser
Attorney

Aug. 5, 1969  P. L. POWELL  3,459,051
SPEEDOMETER

Filed May 5, 1967  2 Sheets-Sheet 2

INVENTOR
Patrick L. Powell

By Norton Lesser
Attorney

United States Patent Office 3,459,051
Patented Aug. 5, 1969

3,459,051
SPEEDOMETER
Patrick L. Powell, Franklin Park, Ill., assignor to Stewart-Warner Corporation, Chicago, Ill., a corporation of Virginia
Filed May 5, 1967, Ser. No. 636,329
Int. Cl. G01p 3/22
U.S. Cl. 73—498                    5 Claims

ABSTRACT OF THE DISCLOSURE

A speedometer having a hair spring secured at one end to an indicator shaft and at the other end to a field cup which is manually rotatable to adjust the rest position of the hair spring.

BACKGROUND OF THE INVENTION

Field of the invention

The present invention pertains generally to a speedometer of the magnetic type used to indicate vehicle speed, and more particularly to a mounting and adjustment assembly for the hair spring of a speedometer.

Description of the prior art

In general, a magnetic type speedometer comprises a rotatable permanent magnet encircled by a stationary field cup. Between the magnet and the field cup is positioned a speed cup secured to a rotatably mounted indicator spindle that carries an indicating pointer. As the magnet revolves within the speed cup, it sets up a rotating magnetic field which exerts a pull or magnetic drag on the speed cup, making it revolve in the same direction. The speed cup rotates to a point where the magnetic drag is just balanced by the retarding force created by a hair spring attached to the indicator spindle. The amount of speed cup deflection is proportional to the speed at which the magnet is being revolved. The hair spring also serves to return the indicator spindle and pointer back to zero when the vehicle stops and the magnet ceases rotating.

For accurate indication of speed, no tension should be imposed by the hair spring on the indicator spindle when the spring is in a rest position and the pointer is at zero. Various arrangements for mounting the hair spring have heretofore been proposed to accommodate this condition of operation. However, prior mounting assemblies have not proved entirely satisfactory. They are difficult to assemble, are difficult to locate accurately during assembly to adjust the hair spring to the proper rest position, and/or do not retain their preset location for maintaining the proper rest position of the spring throughout the normal life of the speedometer.

Summary of the invention

In accordance with the present invention, the speedometer hair spring is secured at one end to the indicator spindle and at the other end to the field cup. Additionally, the field cup is mounted for manual rotation about the axis of the indicator spindle whereby to permit adjustment of the rest position of the hair spring. Still further, means are provided for maintaining the field cup in any preselected rotational position. With the described spring mounting arrangement, assembly of the speedometer is simplified, the rest position of the hair spring is conveniently and accurately adjustable at the time of assembly, and the hair spring is maintained in proper rest position thereafter.

Description of the preferred embodiment

Figure 1:
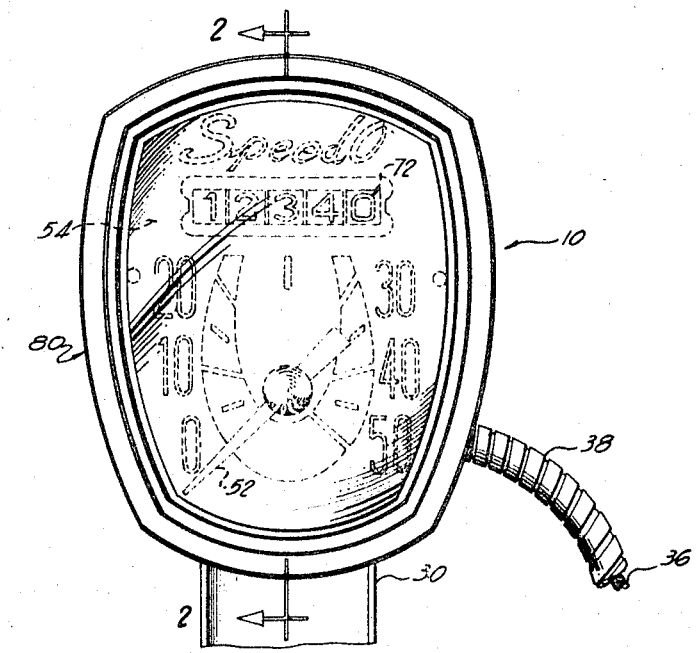
FIGURE 1 is a front elevational view of a speedometer incorporating the principles of the present invention.
Figure 2:
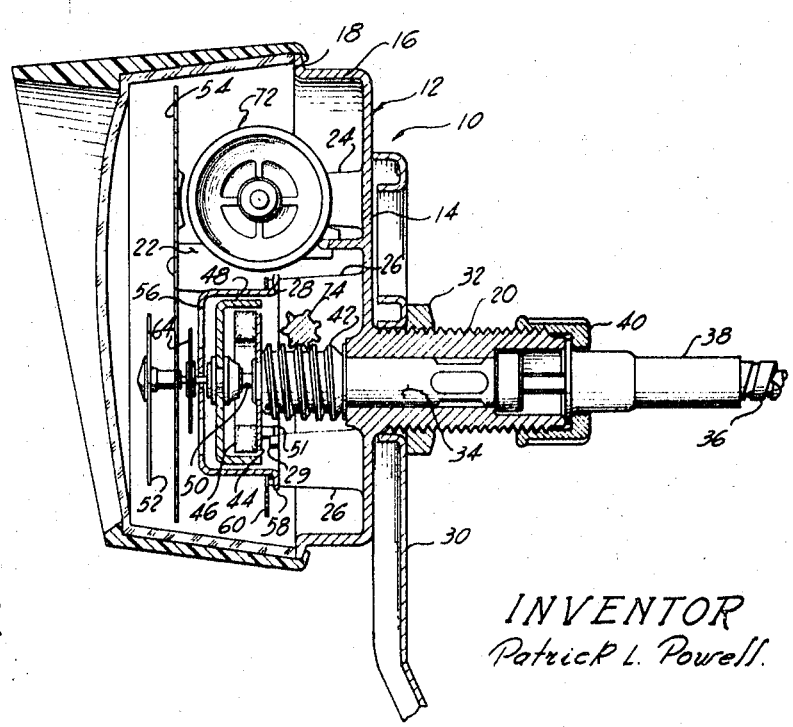
FIGURE 2 is a sectional view of the speedometer of FIGURE 1, taken substantially along the line 2—2 in FIGURE 1, looking in the direction indicated by the arrows.
Figure 3:
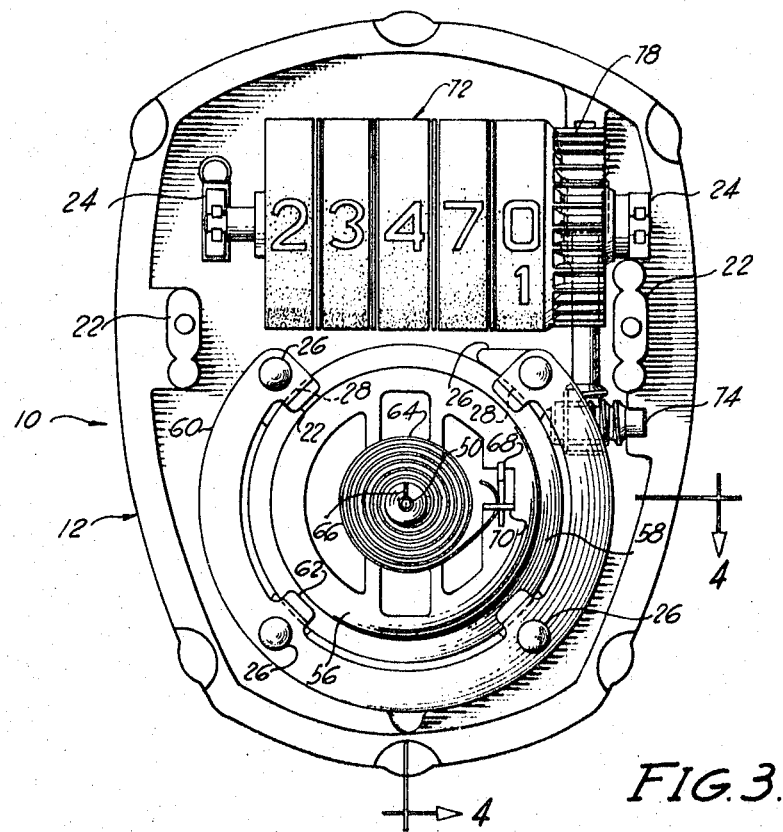
FIGURE 3 is an enlarged front elevational view of the speedometer of FIGURE 1, with the cover, dial plate and indicating pointer removed.
Figure 4:
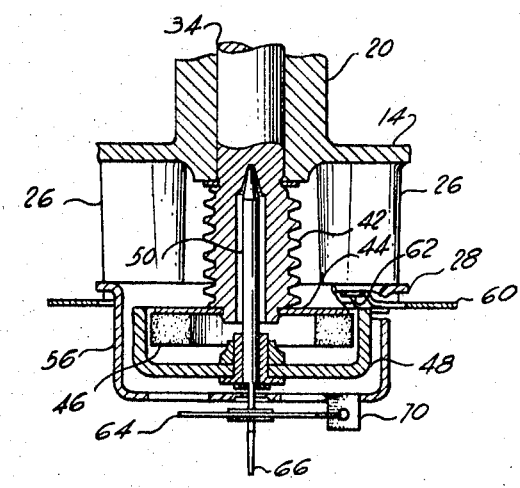
FIGURE 4 is a sectional view of the speedometer of FIGURE 3 taken substantially along the line 4—4 in FIGURE 3, looking in the direction indicated by the arrows.

Referring now to the drawings, there is indicated generally by the reference numeral 10 a speedometer comprising main frame means 12 having a transverse wall portion 14, an axially forwardly extending wall portion 16 with a flange portion 18, and an axially rearwardly extending exteriorly threaded tubular portion 20. The frame means 12 is further provided with laterally spaced axially forwardly extending side arm portions 22, spaced axially extending post portions 24, and circumferentially spaced axially extending post portions 26 formed with shoulders 28 which together define shoulder means. One of the post portions 26 is also formed with a projection or stop 29. The frame means 12 is adapted to be secured in the panel or mounting bracket 30 of a vehicle by means of a nut 32 threaded on the tubular portion 20.

Rotatably mounted in the tubular portion of the main frame 12 is a magnet shaft 34. The outer end of the magnet shaft 34 is adapted to be connected, for example to a vehicle transmission through a flexible shaft 36 enclosed by a flexible casing 38 secured to the outer end of the tubular portion 20 by a coupling 40. The inner end of the magnet shaft is formed with a worm gear portion 42, and has secured thereon a transverse ring 44 which suports an annular permanent magnet 46.

Encircling the magnet 46 is a speed cup 48 which is fabricated of non-magnetic material such as aluminum, and which is secured to the intermediate portion of an indicator spindle 50. The speed cup 48 is provided with an axial finger 51 that is engageable with the stop 29 to establish the zero or rest position of the indicator spindle 50. The inner end of the indicator spindle 50 is rotatably mounted in the magnet shaft 34 coaxially thereof, and the outer end of the spindle has secured thereon an indicating pointer 52. The pointer 52 is arranged to move across suitable speed-identifying indicia provided on the surface of a dial plate 54 secured to the arm portion 22.

Encircling the speed cup 48 is a field cup 56 having an annular flange portion 58 which seats against and is radially located by the shoulders 28 of the post portions 26. The central portion of the field cup 56 provides a journal support for the intermediate portion of the indicator spindle 50. A generally C-shaped spring clip 60 is secured, as by staking, to the ends of the post portions 26 in a position concentrically of the field cup 48. The spring clip 60 has radially inwardly directed tab portions 62 that engage and bias the annular field cup flange 58 into seating engagement with the shoulders 28 of the post portions 26. Arranged immediately forwardly of the field cup 56 is a hair spring 64. The spring 64 is secured at one end, as at 66, to the indicator spindle 50, and is secured at the other end, by means of a wedge pin 68, to an apertured arm portion 70 of the field cup 56.

During assembly of the speedometer 10, the field cup 56 is manually rotated to adjust the position of the hair spring 64 so that no tension is imposed by the latter on the indicator spindle 50 when it is in the rest position established by engagement of the speed cup finger 51 with the stop 29. The spring clip 60 not only accommodates manual rotation of the field cup 56 whereby to permit adjustment of the hair spring 64, but also restrains extraneous rotation of the field cup and maintains the same in any preselected rotational position after the hair spring has once been adjusted.

In a conventional manner, upon rotation of the magnet shaft 34 and magnet 46, a magnetic field is set up which exerts a pull or magnetic drag on the speed cup 48 causing it to revolve in the same direction. The movement of the speed cup is retarded and held steady by the hair spring 64. The speed cup rotates to a point where magnetic drag is balanced by the retarding force exerted by the hair spring. When rotation of the magnet 46 stops, the speed cup is returned to its rest position by the hair spring.

The speedometer 10 further includes a conventional odometer 72 revolvably mounted in the post portions 24. The odometer 72 is adapted to be revolved by the magnet shaft 34 to record distance travelled. More particularly, a first gear shaft 74 has meshing engagement with the worm gear 42 of the magnet shaft 34 and with a second gear shaft 76 which, in turn, has meshing engagement with the gear element 78 of the odometer 72. Also, a conventional cover assembly 80 is engaged behind the frame flange 18 and encloses the forward portion of the speedometer.

While there has been shown and described a preferred embodiment of the present invention, it will be understood by those skilled in the art that various rearrangements and modifications may be made therein without departing from the spirit and scope of the invention.

I claim:

1. In a speedometer or the like having frame means, a magnet shaft rotatably mounted in the frame means, a magnet secured to the magnet shaft, an indicator spindle rotatably mounted coaxially of the magnet shaft, a speed cup secured to the indicator spindle and encircling the magnet, a field cup encircling the speed cup, and a hair spring secured at one end to the indicator spindle, the improvement which comprises means securing the other end of said hair spring to said field cup, means mounting said field cup for manual rotation about the axis of the indicator shaft whereby to permit adjustment of the rest position of said hair spring, and means maintaining said field cup in any preselected rotational position.

2. The improvement set forth in claim 1 wherein said mounting means is comprised of shoulder means provided on said frame means against which said field cup seats.

3. The improvement set forth in claim 1 wherein said maintaining means is comprised of spring means imposing a biasing force on said field cup to restrain movement of the latter from any preselected rotational position.

4. The improvement set forth in claim 1 wherein said field cup includes an annular flange, said mounting means is comprised of shoulder means provided on said frame means against which said annular flange seats, and said maintaining means is comprised of spring means biasing said annular flange into seating engagement with said shoulder means.

5. The improvement set forth in claim 4 wherein said spring means is a generally C-shaped spring clip secured to said frame means concentrically of said field cup and having radially inwardly directed tab portions that engage and bias said annular flange into seating engagement with said shoulder means.

References Cited

UNITED STATES PATENTS

| | | | |
|---|---|---|---|
| 1,857,674 | 5/1932 | Zubaty | 73—520 XR |
| 2,336,172 | 12/1943 | Helgeby | 73—498 XR |

JAMES J. GILL, Primary Examiner

U.S. Cl. X.R.

73—519